(12) United States Patent
Vijayvergia et al.

(10) Patent No.: US 10,354,653 B1
(45) Date of Patent: Jul. 16, 2019

(54) COOPERATIVE DELEGATION FOR DIGITAL ASSISTANTS

(71) Applicant: United Services Automobile Association (USAA), San Antonio, TX (US)

(72) Inventors: Gunjan C. Vijayvergia, San Antonio, TX (US); Matthew Barry Schulz, San Antonio, TX (US); Nathan Mahoney, Boerne, TX (US); Justin Leggett, Bulverde, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/409,262

(22) Filed: Jan. 18, 2017

Related U.S. Application Data

(60) Provisional application No. 62/280,261, filed on Jan. 19, 2016.

(51) Int. Cl.
| | |
|---|---|
| *G10L 21/00* | (2013.01) |
| *G10L 15/30* | (2013.01) |
| *H04L 29/08* | (2006.01) |
| *G10L 15/22* | (2006.01) |
| *G10L 15/26* | (2006.01) |

(52) U.S. Cl.
CPC ............ *G10L 15/30* (2013.01); *G10L 15/22* (2013.01); *G10L 15/265* (2013.01); *H04L 67/148* (2013.01); *G10L 2015/223* (2013.01)

(58) Field of Classification Search
CPC ...................................................... G10L 15/22
USPC ........................................................ 704/275
See application file for complete search history.

(56) References Cited

U.S. PATENT DOCUMENTS

| | | | |
|---|---|---|---|
| 7,885,944 B1 * | 2/2011 | Bruening | G06F 16/33 707/694 |
| 8,844,059 B1 * | 9/2014 | Manmohan | G06F 21/554 726/26 |

(Continued)

OTHER PUBLICATIONS

'developers.google.com' [online]. "Conversation Actions," Dec. 8, 2016, [retrieved on Jan. 6, 2017]. Retrieved from the Internet: URL<http://developers.google.com/actions/develop/conversation>. 4 pages.

*Primary Examiner* — Jakieda R Jackson
(74) *Attorney, Agent, or Firm* — Fish & Richardson P.C.

(57) ABSTRACT

Techniques are described for cooperative delegation of request processing by digital assistants (DAs) in a computing environment. An initial request (e.g., voice command) may be received by a first DA, and a communication session may be initiated during which the first DA handles the initial request and/or subsequent requests. On receiving a request that it is unable to handle, the first DA may transfer control of the session to a second DA. The second DA may handle the request and/or subsequent requests before passing control of the session back to the first DA or to another appropriate DA. Each handling DA may provide output (e.g., voice output or otherwise) associated with their handling of the various requests during the session. In some instances, transfer of control among DAs may be mediated by a broker based on information describing the different capabilities of various DAs.

20 Claims, 8 Drawing Sheets

(56) References Cited

U.S. PATENT DOCUMENTS

| | | | | |
|---|---|---|---|---|
| 2006/0089857 A1* | 4/2006 | Zimmerman | G06F 21/6245 | 705/2 |
| 2006/0117173 A1* | 6/2006 | Deblock | G06Q 20/02 | 713/150 |
| 2006/0272017 A1* | 11/2006 | Largman | G06F 11/1417 | 726/22 |
| 2006/0272024 A1* | 11/2006 | Huang | G06F 21/55 | 726/26 |
| 2007/0005418 A1* | 1/2007 | Nishar | G06Q 30/02 | 705/14.46 |
| 2007/0011105 A1* | 1/2007 | Benson | G05B 13/0275 | 706/1 |
| 2008/0034209 A1* | 2/2008 | Dickinson | H04L 63/08 | 713/168 |
| 2009/0164878 A1* | 6/2009 | Cottrille | G06F 21/6245 | 715/210 |
| 2009/0175444 A1* | 7/2009 | Douglis | H04L 9/083 | 380/45 |
| 2010/0333194 A1* | 12/2010 | Ricordi | G06F 21/32 | 726/17 |
| 2011/0093768 A1* | 4/2011 | Panwar | G06F 21/6245 | 714/809 |
| 2011/0305337 A1* | 12/2011 | Devol | G06F 21/305 | 380/259 |
| 2012/0179564 A1* | 7/2012 | Soroca | G06Q 30/02 | 705/26.3 |
| 2012/0221854 A1* | 8/2012 | Orsini | G06F 21/606 | 713/167 |
| 2012/0278529 A1* | 11/2012 | Hars | G06F 12/0246 | 711/103 |
| 2012/0296768 A1* | 11/2012 | Fremont-Smith | G06Q 30/02 | 705/26.8 |
| 2013/0129075 A1* | 5/2013 | Whitaker | H04M 3/523 | 379/265.09 |
| 2013/0145145 A1* | 6/2013 | Dittmer-Roche | G06F 21/6218 | 713/153 |
| 2013/0266127 A1* | 10/2013 | Schachter | G10L 25/48 | 379/88.01 |
| 2014/0067362 A1* | 3/2014 | Hershenhorn | G06F 17/28 | 704/2 |
| 2014/0114684 A1* | 4/2014 | Semian | G06Q 10/06311 | 705/2 |
| 2014/0201526 A1* | 7/2014 | Burgess | G06F 21/316 | 713/165 |
| 2014/0222436 A1* | 8/2014 | Binder | G06F 3/167 | 704/275 |
| 2014/0230067 A1* | 8/2014 | Sahita | G06T 1/60 | 726/26 |
| 2014/0244513 A1* | 8/2014 | Ballesteros | G06Q 20/382 | 705/64 |
| 2014/0282003 A1* | 9/2014 | Gruber | G06F 3/167 | 715/727 |
| 2014/0310002 A1* | 10/2014 | Nitz | G06Q 30/06 | 704/270.1 |
| 2014/0338004 A1* | 11/2014 | Camiel | G06F 21/62 | 726/30 |
| 2015/0095032 A1* | 4/2015 | Li | G10L 15/08 | 704/255 |
| 2015/0112871 A1* | 4/2015 | Kumnick | G06Q 20/382 | 705/67 |
| 2015/0169029 A1* | 6/2015 | Tian | G06F 9/5094 | 713/300 |
| 2015/0319138 A1* | 11/2015 | Yan | H04L 63/145 | 726/11 |
| 2015/0363474 A1* | 12/2015 | Fogel | G06F 17/30964 | 707/722 |
| 2016/0092570 A1* | 3/2016 | Ago | G06F 17/30864 | 707/770 |
| 2016/0116298 A1* | 4/2016 | Clapper | G01C 21/3629 | 701/428 |
| 2016/0140231 A1* | 5/2016 | Agarwal | G06F 17/30675 | 707/749 |
| 2017/0039281 A1* | 2/2017 | Venkata | G06F 17/30554 | |
| 2017/0048221 A1* | 2/2017 | Melton | H04L 63/08 | |
| 2017/0094018 A1* | 3/2017 | Ekstrom | H04L 67/20 | |
| 2017/0140449 A1* | 5/2017 | Kannan | G06Q 30/0613 | |
| 2017/0185802 A1* | 6/2017 | Barsness | H04L 63/0428 | |
| 2017/0191842 A1* | 7/2017 | Magazinik | G01C 21/3438 | |
| 2018/0041485 A1* | 2/2018 | O'Hare | G06F 21/6209 | |
| 2018/0285590 A1* | 10/2018 | Cosson | G06Q 30/0617 | |

* cited by examiner

COOPERATIVE DELEGATION FOR DIGITAL ASSISTANTS

CROSS-REFERENCE TO RELATED APPLICATION

The present disclosure is related to, and claims priority to, U.S. Provisional Patent Application Ser. No. 62/280,261, titled "Cooperative Delegation for Digital Assistants," which was filed on Jan. 19, 2016, the entirety of which is hereby incorporated by reference into the present disclosure.

BACKGROUND

Device manufacturers, operating system providers, and application developers provide digital assistants, which may also be described as personal assistants, for execution in a computing environment. Such digital assistants may listen for voice commands from a user, and respond to the voice commands by performing searches, adding items to a shopping cart, launching applications, or performing other operations implicated by the commands. Currently, in situations where multiple digital assistants are available in a computing environment for processing commands, the multiple digital assistants may operate independently with no relationship or connection between the various digital assistants.

SUMMARY

Implementations of the present disclosure are generally directed to employing multiple digital assistants to process requests within a computing environment. More specifically, implementations are directed to the at least partial delegation of a request from a first digital assistant to a second digital assistant, in which the second digital assistant is instructed to process at least aspects of the request that are delegated to the second digital assistant by the first digital assistant.

In general, innovative aspects of the subject matter described in this specification can be embodied in methods that includes actions of: receiving a first request communicated to a first digital assistant (DA) executing in a computing environment comprising one or more computing devices and, in response, initiating a communication session that employs the first DA to handle the first request; receiving, during the communication session, a second request and, based at least partly on the second request, determining a second DA to handle the second request, wherein the second DA is executable within the computing environment; and transferring the communication session from the first DA to the second DA to handle the second request.

Implementations can optionally include one or more of the following features: determining the second DA includes accessing a DA directory that includes, for each of a plurality of DAs, a list of associated keywords; determining the second DA includes determining that at least one term in the second request corresponds to at least one keyword that is associated, in the DA directory, with the second DA; determining that the at least one term in the second request corresponds to the at least one keyword includes one or more of determining that the at least one term matches the at least one keyword, or determining that the at least one term is semantically similar to the at least one keyword; determining the second DA further includes accessing a DA directory that includes, for each of a plurality of DAs, a list of associated keywords; determining the second DA further includes determining that at least one term in the second request corresponds to at least one keyword that is associated, in the DA directory, with a plurality of candidate DAs; determining the second DA further includes requesting, by the first DA, that a user select the second DA from the plurality of candidate DAs; determining the second DA further includes receiving a selection of the second DA provided by the user; the determining of the second DA is based on a model that is developed through machine learning; the communication session is a voice communication session in which the first request and the second request are provided as voice input from a user; the first DA provides first audio output associated with handling the first request during the voice communication session; the second DA provides second audio output associated with handling the second request during the voice communication session; the first audio output is provided by the first DA in a different voice than that in which the second audio output is provided by the second DA; the actions further include receiving, during the communication session, a third request and, based at least partly on at least one term in the third request, determining a third DA to at least partly process the third request, wherein the third DA is executable within the computing environment; the actions further include transferring the communication session from the second DA to the third DA to handle the third request; transferring the communication session from the first DA to the second DA causes the second DA to handle the second request and at least one subsequent request received during the communication session; transferring the communication session from the first DA to the second DA includes transferring state information for the communication session from the first DA to the second DA, the state information at least describing information previously communicated during the communication session; the actions further include storing state information that at least describes information communicated during the communication session; and/or transferring the communication session from the first DA to the second DA includes accessing, by the second DA, the stored state information.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. By providing a mechanism through which one digital assistant can delegate the processing of a request to another digital assistant with different capabilities, implementations enable digital assistants to respond cooperatively to requests that a single digital assistant may not be able to handle alone. Accordingly, implementations provide a technical advantage over traditional computing systems in which multiple digital assistants may redundantly attempt to process requests which, in some instances, may not be suitable for a particular assistant, thus leading to an unnecessary expenditure of processing, memory, and/or networking resources. By employing a broker that forwards a request, and transfers control of a communication session, to a suitable digital assistant instead of sending the request to all available digital assistants, implementations enable the more efficient processing of requests in a computing environment with multiple digital assistants.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
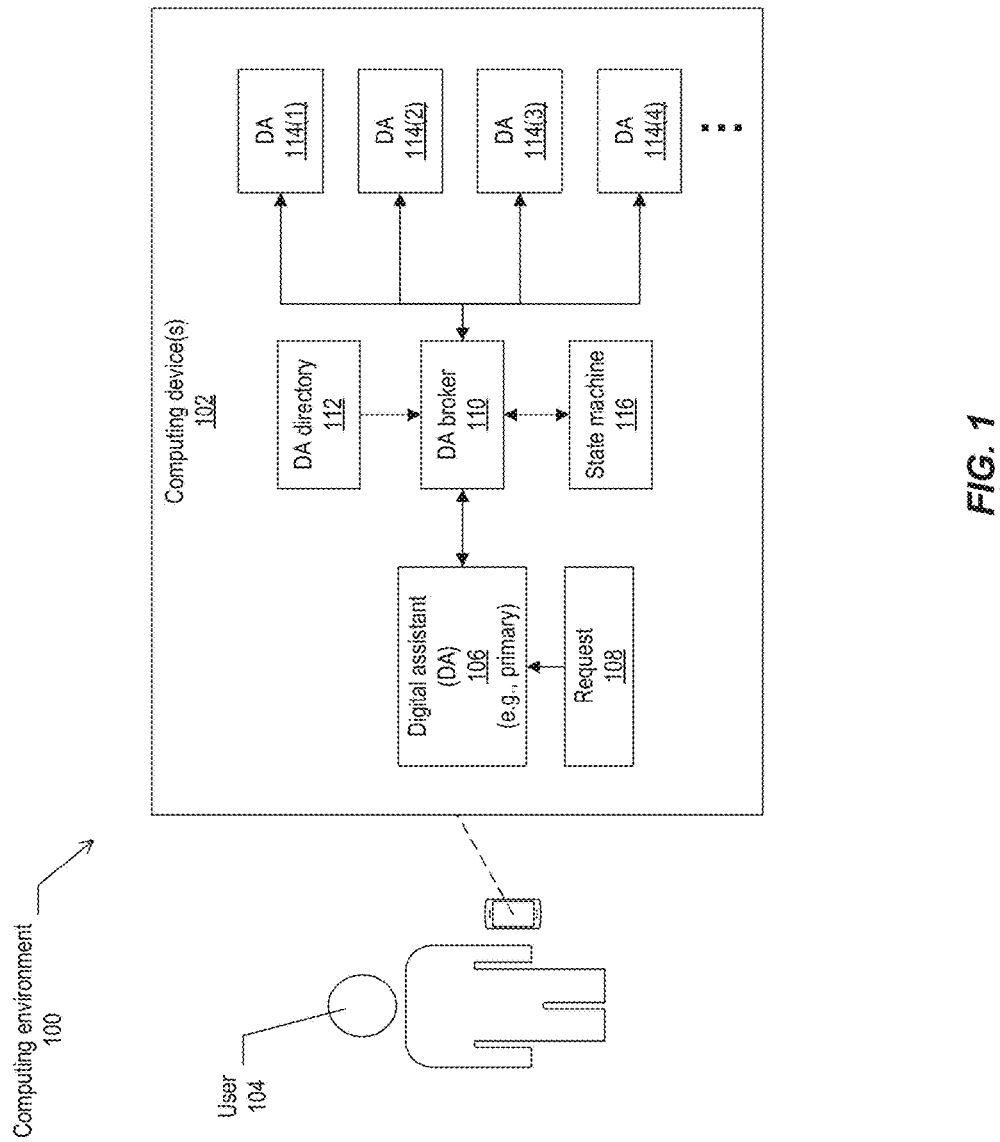
FIG. 1 depicts an example computing environment in which multiple digital assistants may interact and cooperate to process requests, according to implementations of the present disclosure.

Implementations of the present disclosure are directed to systems, devices, methods, and computer-readable media for cooperative delegation of request processing among multiple digital assistants (DAs) executing on one or more computing devices in a computing environment. Implementations provide a framework and a mechanism to enable DAs to communicate with one another to delegate request(s) and/or cooperate to handle request(s) according to the various (and in some instances varying) capabilities of the DAs. As described herein, a DA may include any process that executes on a computing device to receive requests from a user, perform operation(s) to process the request, and/or provide result(s) of the operation(s) to the user. A DA may also be described as a personal digital assistant. A DA may be configured to process requests that are provided by the user as voice commands, inputs to a graphical user interface, or through other types of input. In some examples, a DA may detect speech input that includes utterance(s) by the user, interpret the speech input to determine the user's request, and process the request appropriately. For example, the user may ask the DA to add an item to a shopping cart of the user, such as a shopping cart provided by an online shopping and/or e-commerce service. The DA may process the request by identifying the specified item and adding that item to the user's shopping cart. As another example, the user may ask the DA to look up information regarding a business, such as the address, phone number, and so forth. The DA may perform operations to access the requested information, and provide (e.g., audio) output describing the requested information.

In some examples, a DA may be provided by a hardware manufacturer, such as a mobile device manufacturer, and/or an operating system (OS) provider. Examples of such digital assistants include: Siri™, provided by Apple Inc.; Google Now™, provided by Google, Inc.; and Cortana™, provided by Microsoft Corp. In some instances, the device manufacturer and/or OS provider that provided the DA may also have manufactured or otherwise provided the hardware and/or software of the computing device where the DA executes. Such DAs may be configured to perform various types of operations in response to various requests, and may be described as general purpose DAs. One or more DAs may also be provided by various service providers, and may be configured to perform more specific types of operations related to the service and/or specialty of each service provider. For example, a financial services organization such as a bank, investment broker, insurance company, and so forth, may provide an application (e.g., a mobile app) that executes on a user's computing device to provide services related to banking, investments, insurance, and so forth. The application may include a DA that processes user requests associated with the provided services. For example, a user may ask the more financial service-focused DA to transfer funds from one bank account to another, buy a number of shares of a particular stock, initiate a process to apply for a credit card, pay a bill, or perform some other task.

In some computing environments, multiple DAs may be available to process different types of user requests with varying degrees of specificity. In some examples, a user may prefer to generally use a more general purpose DA to handle more frequent requests, such as user requests to locate a business, retrieve facts from a knowledge base, play music, and so forth. However, such a general purpose DA may lack the capability to handle more specific types of requests, such as financial services requests. In traditional systems, even though a service-focused DA may be available for execution in a computing environment, it may be cumbersome for a user to switch between DAs for handling different types of requests. Accordingly, the implementations described herein enable one DA, such as a general purpose DA, to delegate the processing of a request to another DA, such as a service-focused DA. Such delegation provides for a better user experience and a more efficient use of multiple DAs compared to traditional systems. Moreover, because a particular DA may be configured to handle certain types of requests better than others, delegation of such requests to the particular DA may lead to more efficient use of memory, processing power, network bandwidth, storage space, and/or other computing resources compared to the handling of requests by other, less suitable, DAs.

Handling a request by a DA may include the DA perform any suitable number of actions based on the request. For example, a DA may receive a request for information and may handle the request by retrieving the information from a local, or remote, data source, and providing the information as output to the user. As another example, a DA may receive a request for a particular action or set of actions to be performed, such as a transaction to transfer funds, make a purchase, or some other transaction. The DA may handle such a request by performing the requested action(s), or by sending a communication to another service (local or remote) to request that the other service perform the action(s). The DA may then provide output to the user indicating whether the requested action(s) were successfully performed, a status of the action(s), result(s) of the action(s), and so forth. Handling a request may also include performing any appropriate number of intermediate operations prior to performing the requested action(s), such as connecting to local or remote data storage, establishing a network connection with other services, and so forth. Handling a request may also include asking the user for additional information, such as security credentials and so forth.

FIG. 1 depicts an example computing environment 100 in which multiple DAs may interact and cooperate to process requests from one or more users, according to implementations of the present disclosure. As shown in the example of FIG. 1, the computing environment 100 may include any number of computing devices 102 that are owned by, operated by, associated with, and/or otherwise in proximity to a user 104. The computing device(s) 102 may include one or more mobile and/or portable devices as shown in the example of FIG. 1, such as a smartphone, a tablet computer, a wearable computer, an implanted computing device, an automotive computer (e.g., telematics and/or navigation system), a mobile gaming platform, and so forth. The computing device(s) 102 may also include one or more less portable computing devices, such as a desktop computer, a game console, a smart appliance, an Internet-of-Things (IoT) device, and so forth. The computing device(s) 102 may include at least one device that is particularly configured with regard to its hardware and/or software to execute a particular DA, such as the Echo™ device provided by Amazon.com. The computing device(s) 102 may include device(s) with a visual display capable of presenting a user interface, device(s) with audio input/output capabilities (e.g., without a visual display), and/or device(s) that support other types of input and output. The various computing devices 102 may be configured to communicate with one another, and/or with external computing devices, over one or more networks (not shown) such as one or more wired and/or wireless local area networks (LANs), personal area networks (PANs), wide area networks (WANs), and/or other types of network(s).

The computing device(s) 102 may execute a DA 106, which may be described as a primary DA. In some examples, the primary DA may be a general purpose DA provided by a hardware manufacture, operating system provider, or other entity. The computing device(s) 102 may also include one or more other DAs 114, which may be described as secondary DA(s). The DA(s) 114 may include service-focused DA(s) that are configured to handle requests of a particular type and/or related to a particular area of inquiry or subject matter. In some examples, one or more DAs 114 may execute in parallel with the DA 106. In some examples, one or more DAs 114 may be present (e.g., installed) on the computing device(s) 102 but may not execute (or may be asleep, suspended, or otherwise inactive) until instructed to process a request.

The DA 106 may receive a request 108 specified by a user 104. In some examples, the DA 106 may determine that it is not able to process at least a portion of the request 108 from the user 104. In such instances, the DA 106 may communicate the request 108 to a DA broker 110 that executes on the computing device(s) 102. The DA broker 110 may execute on the same computing device 102 as the DA 106, or on a different computing device 102. In some implementations, the DA broker 110 may be incorporated with the DA 106. In some implementations, the DA broker 110 may include a library, application programming interface (API), and/or other software module that is callable from the DA 106. The DA broker 110 may analyze the request 108 and determine at least one DA 114 that is suitable for processing at least the portion of the request 108 that cannot be handled by the DA 106. In some implementations, the DA broker 110 may access a DA directory 112 to determine which DA(s) 114 may be suitable for processing a particular request 108, as described further with reference to FIG. 2.

The DA broker 110 may forward the request 108, or at least a relevant portion of the request 108, to the designated DA 114 for processing. The DA 114 may perform one or more operations to process the request 108. In some implementations, the DA 114 may send the result(s) of its operation(s) back to the DA 106, e.g., via the DA broker 110. The DA 106 may output the result(s) (as audio output or otherwise) to the user 104, and/or may request additional processing be performed by the DA 114. In this way, implementations enable the DA 106 to delegate a task to the DA 114 in instances where the DA 106 is not configured to perform a particular type of task. The delegation may include establishing a connection between the DA 106 and the DA 114, either directly or using the DA broker 110 as an intermediary, to enable the two DAs to cooperate to complete the request 108 specified by the user 104. Such cooperation may be described as cooperative delegation of request handling among multiple DAs.

In some implementations, the computing device(s) 102 execute a state machine 116. The state machine 116 may perform operations for lifecycle management of a conversation between the user 104 and one or more DAs 114, which may also be described as a session between the user 104 and the DA(s) 114. In some implementations, the state machine 116 determines and stores state information that describes a state of the session at one or more times. State information may identify the user 104 and the one or more DAs 114 currently participating in session. The state information may also describe the particular DA 114 that is currently active and/or in control of the session, such as the DA 114 that is currently interacting with the user 104 at a particular time during the session. The state information may also describe the DA(s) 114 that have previously interacted with the user 104 during a session, and the sequence and timing of the transfer of control between DAs. The state information may also include information that is relevant to the session, such as information provided by the user 104 during a session.

In some implementations, the state information includes access control information describing the particular pieces of user-provided information (e.g., private information) that are accessible, or not accessible, to particular DA(s). For example, a first DA may begin a session with the user, and then transfer control to a second DA in response to the user stating that they want to check a bank account balance. The user may provide account information to the second DA, which may retrieve and provide account balance information. In such examples, the state information may include the account information and/or account balance information, and the state information may control access such that the second DA may access the account information and/or account balance information but the first DA may not access the information, given its private and/or sensitive nature. For sessions that involve multiple DAs, the state information may enable information to be accessed by the DAs and selectively shared among the DAs, according to their particular access privileges, during the session.

The stored state information may be accessed by processes to replay a particular session at a later time, determine an audit record and/or history of a session, audit the system for compliance with relevant rules or laws, generate reports, and/or to restore a session to its previous state after an interruption. In some implementations, the state machine 116 stores the state information in a centralized or distributed database or other type of data storage.

In some implementations, the state information may be stored in a distributed ledger such as a blockchain. A blockchain, or distributed ledger, may provide a (e.g., public) ledger of all transactions that have been executed in one or more contexts (e.g., negotiable instrument transactions, digital currency transactions, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., deposits, withdrawals, etc.) to validate a requested transaction, all entities agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner demonstrates a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value has at the beginning (e.g., at least the first four characters of the hash value are each zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., a digital currency) to be transferred between multiple blockchains.

Figure 2:
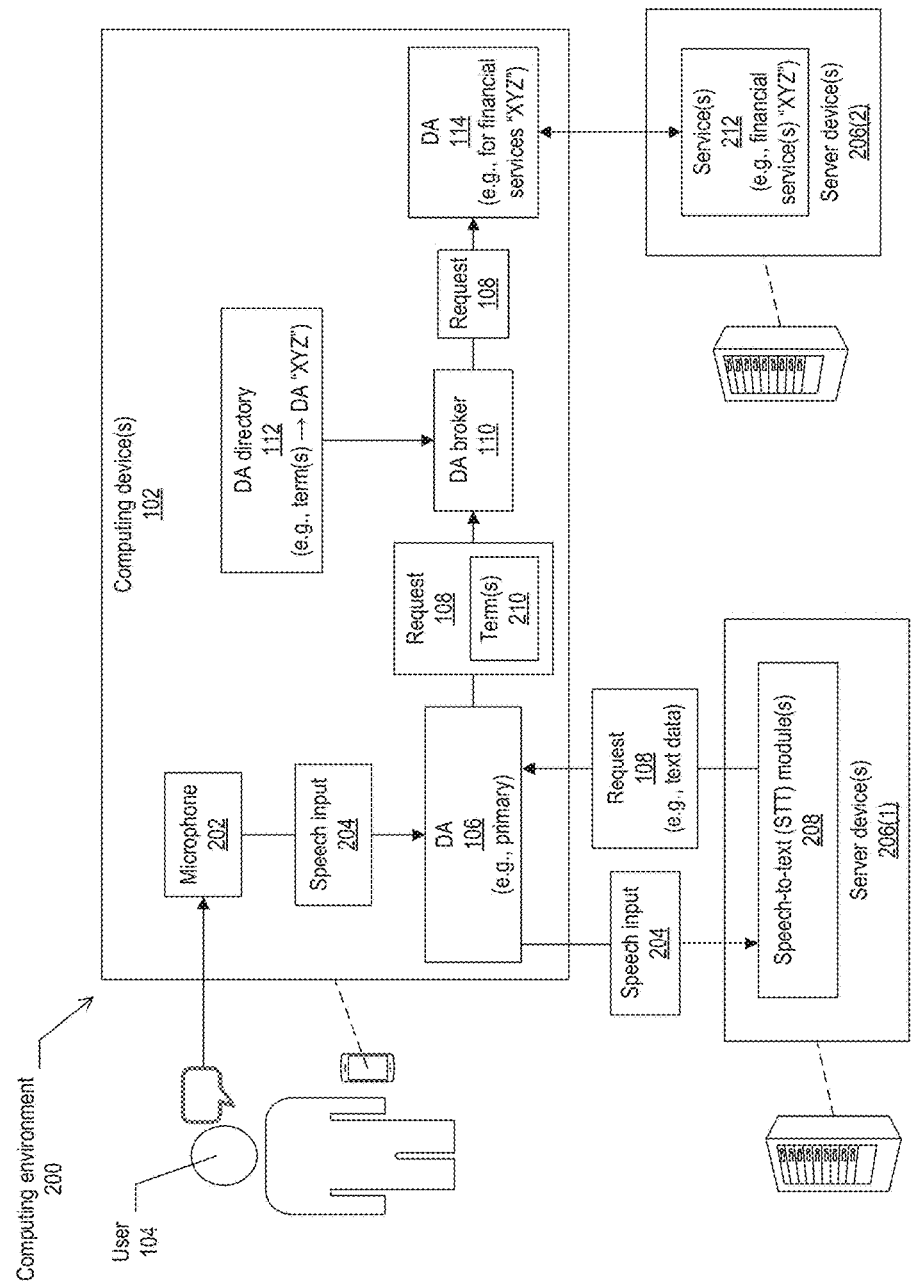
FIG. 2 depicts an example computing environment in which multiple digital assistants may interact and cooperate to process requests, according to implementations of the present disclosure.

FIG. 2 depicts an example computing environment 200 in which multiple DAs may interact and cooperate to process requests, according to implementations of the present disclosure. Various elements of FIG. 2 may be configured similarly to like-numbered elements of FIG. 1 and/or may perform operations that are similar to those performed by like-numbered elements of FIG. 1. As shown in the example of FIG. 2, the user 104 may utter speech input 204 (e.g., voice command(s)) which may be received by a microphone 202 or other audio input component(s) of the computing device(s) 102. The microphone 202 may provide the speech input 204 to the DA 106 in any supported audio format. In some implementations, the DA 106 may communicate the speech input 204 over one or more networks to one or more server devices 206(1). The server device(s) 206(1) may execute one or more speech-to-text (STT) modules 208. The STT module(s) 208 may analyze the speech input 204 and generate the request 108 as at least a partial text transcription of the speech input 204. The request 108 may then be communicated to the DA 106. In some implementations, the analysis of the speech input 204 may be performed locally on the computing device(s) 102. For example, the DA 106 may include one or more sub-modules to perform STT operations and/or the STT module(s) 208 may execute locally on the computing device(s) 102.

The request 108 generated by analysis of the speech input 204 may include one or more terms 210. As used herein, a term 210 may be a single word or a combination of multiple words (e.g., a phrase, a sentence, a sentence fragment, etc.). A term 210 may also include a number, an acronym, or any other portion of text data. The request 108 may include any number of terms 210. As described with reference to FIG. 1, the DA 106 may examine the request 108 to determine whether the request 108 may be handled by the DA 106. If the DA 106 determines that it is not capable of processing at least a portion of the request 108, the DA 106 may communicate the request 108 including the term(s) 210 to the DA broker 110.

The DA broker 110 may analyze the term(s) 210 in the request 108 to identify a DA 114 that may be suitable for processing the request 108. In some implementations, the DA broker 110 may access a DA directory 112 to perform this determination. In some implementations, the DA directory 112 may include, for each of one or more DAs 114, a list of keywords that are associated with that DA 114. For example, the DA directory 112 may include a list of keywords associated with the DA XYZ of a financial services application. Such keywords may include "bank," "banking," "credit card," "loan," "funds," "cash," "bills," and so forth. As used herein, a keyword may be a single word, multiple words, and/or any amount of alphanumeric text, symbols, acronyms, or other information.

The DA broker 110 may compare the term(s) 210 in the request 108 to determine whether such term(s) 210 correspond to the list of keywords included in the DA directory 112 for one or more DAs 114. A correspondence between the term(s) 210 and keyword(s) may include a match of term(s) 210 and keyword(s). A correspondence may also include a semantic similarity between term(s) 210 and keyword(s). For example, if the term(s) 210 include "loan application" and the keyword(s) for a DA 114 include "line of credit," the DA broker 110 may determine a correspondence between the term(s) 210 and the keyword(s) based on a semantic similarity between "loan application" and "line of credit." A semantic similarity may be determined through a natural language based analysis of the term(s) 210 and keyword(s). In such an example, the DA broker 110 may determine that the particular DA 114 is suitable for processing the request 108 related to a loan application. The comparison may take into account different word forms, parts of speech, gerunds, and so forth. For example, "bill" may be determined to correspond to "bills," "paying" may be determined to correspond to "payment," and so forth. Implementations support the use of any language by the user 104 to specify the request 108, and the use of any language by the DAs to provide output such as audio output to the user 104.

Based on an identification of the particular DA 114 that is suitable for handling the request 108, the DA broker 110 may send the request 108 to the identified DA 114. In some examples, the DA 114 may already be executing when it receives the request 108. Alternatively, the DA broker 110 may launch the DA 114 or cause the DA 114 to be launched to process the request 108. In some examples, the DA 114 may awaken and/or activate from sleep and/or suspension to process the request 108. The DA 114 may perform one or more operations to process the request 108. In some examples, the operation(s) performed by the DA 114 may include communicating over one or more networks with service(s) 212 executing on server device(s) 206(2), and requesting that the service(s) 212 perform certain action(s). For example, to process a request to pay a bill identified in the request 108, the DA 114 may send a message to the service(s) 212 to instruct the service(s) 212 to perform an automated clearing house (ACH) transfer or other type of transfer to pay the identified bill using funds from an account of the user 104. The service(s) 212 may send the DA 114 status information indicating whether the requested action(s) completed successfully, failed, and/or are in progress. In some implementations, the DA 114 may communicate such status information back to the DA 106, e.g., via the DA broker 110, as a result of the request 108. The DA 106 may cause an audio output device (e.g., speaker) of the computing device(s) 102 to emit audio output (e.g., speech) describing the result, thus providing feedback to the user 104 regarding the request 108.

In some implementations, the primary DA 106 is initially surfaced such that the user 104 is able to interact with the DA 106 and ask it to complete a request 108. The primary DA 106 may not be able to handle the request 108, or particular aspect(s) of the request 108, and may send at least a portion of the request 108 to the DA broker 110 to enable other secondary DA(s) 114 to process those aspect(s) of the request 108 that the primary DA 106 is not configured to handle. For example, the user 104 may ask the primary DA 106 to "transfer funds from checking to savings." The primary DA 106 may parse the term(s) 210 of the request 108 and determine that it is unable to perform this operation. The primary DA 106 may send the request 108 to the DA broker 110. The DA broker 110 may analyze the term(s) 210 as described above and determine that a banking DA 114 is best suited for handling the request 108. The DA broker 110 may send the request 108 to the banking DA 114. In instances where multiple banking DAs 114 are present in the environment 100, the DA broker 110 may instruct the primary DA 106 to ask the user 104 which banking DA 114 is to be used.

In some instances, the banking DA 114 may need more information to process the request 108. For example, the banking DA 114 may need to know particular account numbers, an amount to transfer, a date and/or time to perform the transfer, or other information. In such instances, the banking DA 114 may request (e.g., through the DA broker 110) that the primary DA 106 ask the user 104 for the needed information. Alternatively, the DA 114 may surface and at least temporarily take over the user interaction from the primary DA 106. In such examples, the DA 114 may employ its own audio input/output interface to ask the user 104 for the additional information and provide feedback to the user 104. In some implementations, the DA 114 may employ a different voice from the primary DA 106 or may otherwise indicate audibly that the DA 114, and not the primary DA 106, is currently interacting with the user 104. In some examples, the use of a different voice by the DA 114 may provide the user 104 with confidence that a sensitive (e.g., financial) transaction is being handled by the DA 114 that is suited for completing the transaction securely and reliably. In some implementations, the DA(s) 114 and the DA 106 may communicate using a same voice to provide a seamless and/or consistent user experience for the user 104. After the DA 114 has completed the processing of the request 108, the DA 114 may pass control back to the DA 106 to enable the DA 106 to process further request(s) 108 from the user 104. In some instances, the DA 114 may communicate to the DA 106 a status of the processing of the request 108, such as whether the processing is complete, incomplete (e.g., in progress), succeeded, failed, and so forth.

In some instances, the DA 114 may ask the user 104 to provide login credential(s) to authenticate the user 104 to the DA 114 and/or the service(s) 212, such as a personal identification number (PIN), password, username, answer(s) to challenge question(s), and so forth. Such credential(s) may have been previously set up by the user 104 with the service(s) 212. In some implementations, the DA 114 may execute within a trusted execution environment and/or execution container that is separate from the primary DA 106 and/or other DA(s) 114. By executing the DA 114 within a trusted execution environment and/or execution container, implementations may prevent the DA 106 from gaining access to credential(s) and/or other sensitive, confidential information such as account numbers, personally identifiable information (PII), and so forth. Implementations provide for a secure conversation between the user 104 and a DA, such that only one DA at a time may be listening to, receiving information from, and providing output to the user 104. In some implementations, the isolation of a DA 114 in a trusted execution environment may be performed based on a determination (e.g., by the DA broker 110) that the interactions with the user 104 include the communication of sensitive information. In some implementations, the user 104 may indicate that the conversation is sensitive and may request that a higher level of security be applied, such as the use of a trusted execution environment for executing the DA 114. In some implementations, based on a determination that the conversation between the user 104 and a DA has shifted from non-sensitive to sensitive, the DA, the DA broker 110, or other module may request that the user 104 authenticate themselves to an application executing on the computing device(s) 102. In some instances, the application may take over the handling of the request 108 to provide a more secure environment.

Some implementations may omit the DA broker 110, and the primary DA 106 may perform actions to determine an appropriate DA 114 for handling a request 108, using the information in the DA directory 112. In such implementations, the DA 106 may (e.g., directly) send the request 108 to the DA 114 for processing and receive the result(s) of the processing from the DA 114. In some implementations, the DA broker 110 may act as an intermediary between DAs as described herein. In some implementations, the DA 106, the DA broker 110, and/or the DA(s) 114 may implement a common interface to enable communications between the DAs either directly or via the DA broker 110. In some implementations, the communications between the DA 106 and the DA(s) 114, either direct or via the DA broker 110, may employ a communications protocol that is supported by the DA 106, the DA(s) 114, and/or the DA broker 110. In some implementations, the DA(s) 114 may be implemented as plugin(s) to the DA 106. Such plugin(s) may add additional functionality or request-processing capabilities to the DA 106.

In some implementations, the communications between the DA 106 and the DA 114, either direct or via the DA broker 110, may send text data such as the term(s) 210 of the request 108. Alternatively, the communications may send audio data back and forth between the DAs. For example, instead of or in addition to sending the text term(s) 210 to the DA 114, the DA 106 may send a portion of the speech input 204 to the DA 114 using any audio data format. The DA 114 may perform its own STT analysis to determine text data based on the audio data, or the DA 114 may send the audio data to the service(s) 212 for transcription and receive text data in response. In some implementations, the DA 106 may send both text term(s) 210 and speech input 204 to the DA broker 110. The DA broker 110 may employ the text term(s) 210 to determine the appropriate DA 114, and the DA broker 110 may send the speech input 204 to the identified DA 114 for processing.

Implementations provide for a conversation between the DA 106 and the DA(s) 114 in which text data, audio data, and/or other types of information and communicated between the DAs. This conversation may be a two-way conversation through which the DAs cooperate to process a request 108, instead of a one-way call in which the DA 106 instructs the DA 114 to perform certain operations. Moreover, although examples herein may describe a particular DA 106 as the primary DA that initially handles interactions with the user 104 and other DA(s) as the secondary DA(s) that are delegated certain tasks, any DA may function as either a primary DA or a secondary DA under various circumstances. In some implementations, the primary DA is a general purpose DA that provided by a hardware manufacturer or operating system developer, and the secondary DA is provided by a service provider such as a financial service provider. In some implementations, both the primary DA and the secondary DA are provided by a service provider and the different DAs may support different scopes of functionality. For example, the service provider may provide the primary DA to handle more general financial services requests related to banking, insurance, investments, and so forth, and the service provide may provide the secondary DA to handle more specific types of requests, such as requests associated with auto insurance payments, claims processing, auto repairs, and so forth.

The DA directory 112 may include information to enable the DA broker 110 and/or the DA 106 to determine which DA 114 may be suited for handling a particular request 108. In some implementations, the DA broker 110 and/or the DA 106 may perform a natural language (NL) and/or semantic analysis of one or more term(s) 210 in the request 108 to determine a topic, classification, subject matter, and/or type for the request 108. Such an analysis may be performed instead of, or in addition to, the use of the DA directory 112.

In some implementations, the DA directory 112 may be decentralized directory that is distributed across multiple computing device(s) 102 to be available to determine delegation of request processing. In some implementations, no single entity or computing device 102 may own or be responsible for the DA directory 112. Each DA 114 and/or associated service 212 may publish the capabilities of the DA 114 to update the DA directory 112, and such updates may be distributed among the versions of the DA directory 112 on various device(s) 102 via a publication model for data distribution. In some implementations, a DA 114 may register with the DA broker 110 and/or the DA 106 to advertise the capabilities of the DA 114 for handling particular type(s) of requests 108. The publication of the capabilities of the DA 114 to the DA broker 110 and/or the DA 106, and the publication of the capabilities of the DA 114 to update the DA directory 112, may include specifying one or more keywords associated with the DA 114 to indicate the type(s) of requests 108 that may be handled by the DA 114. In some examples, each DA 106 may be associated with its own DA directory 112 to be used in delegating requests 108 from the DA 106 to various DA(s) 114. Alternatively, multiple DAs 106 may employ a common DA directory 112 for use in delegations.

The DA directory 112 may include, for each DA 114, a list of keywords associated with the capabilities of the DA 114 for handling requests 108. The DA directory 112 may also include additional information regarding each DA 114. For example, the DA directory 112 may provide a name of the DA 114 as well as a landing spot, launch point, listener network address and/or port number, a service name and/or address, an application endpoint, and/or other information that indicates a location where the DA 114 is available on a network and/or in a file system. In some implementations, the order of DAs 114 in the DA directory 112 may indicate a preference order for DAs 114. For example, in instances where more than one DA 114 is suitable for handling a particular request 108, the first (e.g., or last) DA 114 listed in the DA directory 112 may indicate the DA 114 to be selected for delegation.

In some implementations, the interactions between DA 106 and DA(s) 114 may be recorded and stored to enable subsequent auditing or other analysis of the processing of requests 108, or for other purposes. In some examples, the interactions may be captured and stored by the DA broker 110. The storage of interactions between DAs may be performed for particular types of requests 108. For example, if a request 108 for a funds transfer higher than a threshold amount (e.g., large transfers) is processed through the cooperative delegation described herein, the communications between DAs and/or operations performed by DAs may be stored for later analysis and auditing if needed.

In some implementations, the primary DA 106 may provide additional information to the DA 114 in the request 108 along with the term(s) 210 and/or the speech input 204. For example, the DA 106 may communicate context information to the secondary DA 114, such as the user's name, identification number(s), location, demographic information, purchase history, search history, and/or other information to help the DA 114 process the request 108. In some implementations, the transfer of information between DAs may be a one-way transfer, for at least some of the information used in processing a request 108. For example, the secondary DA 114 may be provided with all the information available to the DA 106, but the DA 114 may not provide the DA 106 with at least some of the information accessible to the DA 114. The secondary DA 114 may know what the DA 106 knows, but the DA 106 may not know everything that the secondary DA 114 knows.

In some instances, the primary DA 106 may determine that it is able to process a particular request 108, but that one or more other secondary DAs 114 may also be configured to handle the request 108. In such situations, the primary DA 106 may ask the user 104 whether they prefer to have the request 108 handled by the primary DA 106 or a secondary DA 114. In some instances, multiple DAs 114 may be able to handle a particular request 108. In such instances, the primary DA 106 may ask the user 104 to indicate which secondary DA 114 they prefer to handle the request 108. In instances where the primary DA 106 is unable to handle a request 108 and no secondary DA 114 is identified as able to handle the request 108, the primary DA 106 may ask the user 104 to clarify the request 108 and/or indicate that the request 108 cannot be processed.

A DA (e.g., DA 114 and/or DA 106) may include or communicate with a listener that listens for requests that are being delegated to be handled by the associated DA. In some implementations, that listener may be a RESTful service. The listener may receive a delegation of a request 108, analyze the term(s) in the request 108, and determine whether the associated DA is able to handle the request 108. If not, the delegating DA may be notified that the target DA is unable to process the request 108. If the target DA is able to handle the request 108, the DA may proceed to do so.

Figure 3A:
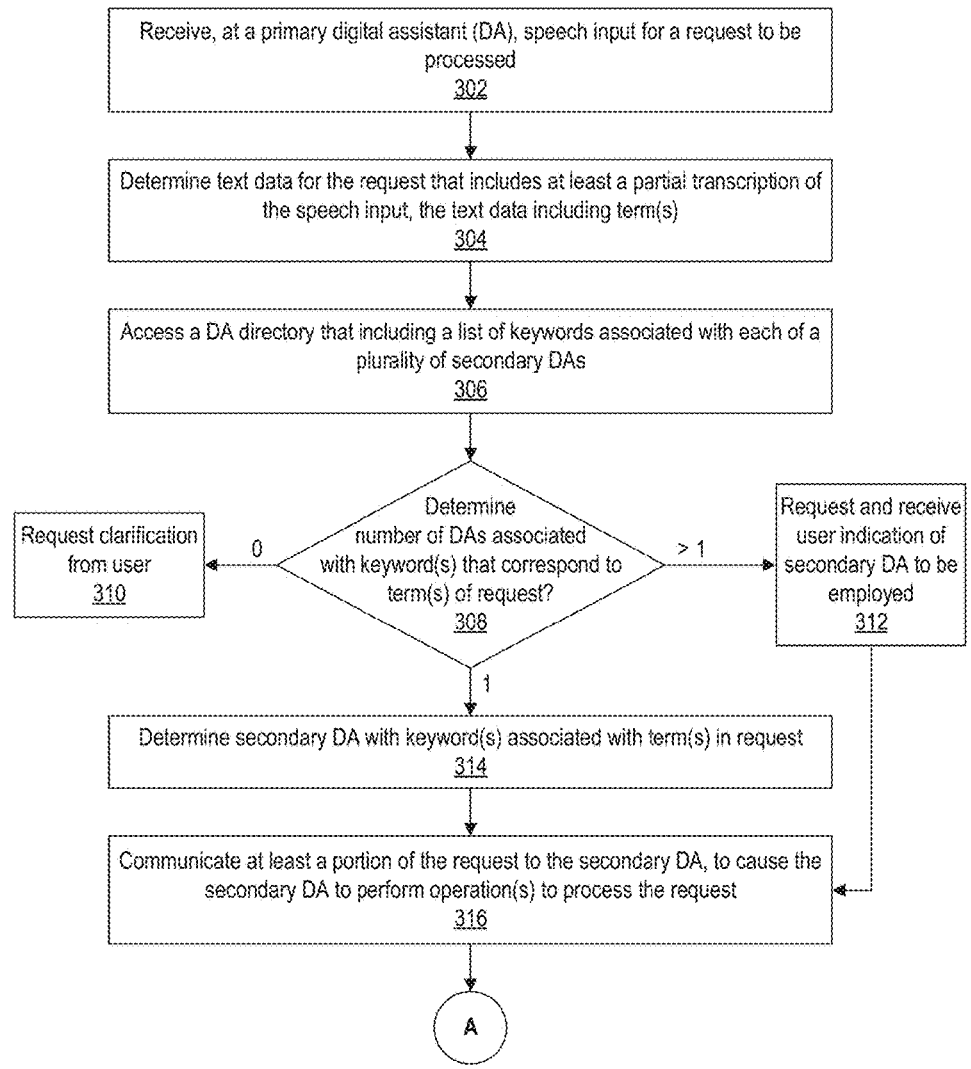
FIGS. 3A and 3B depict a flow diagram of an example process for managing interactions between digital assistants, according to implementations of the present disclosure.
Figure 3B:
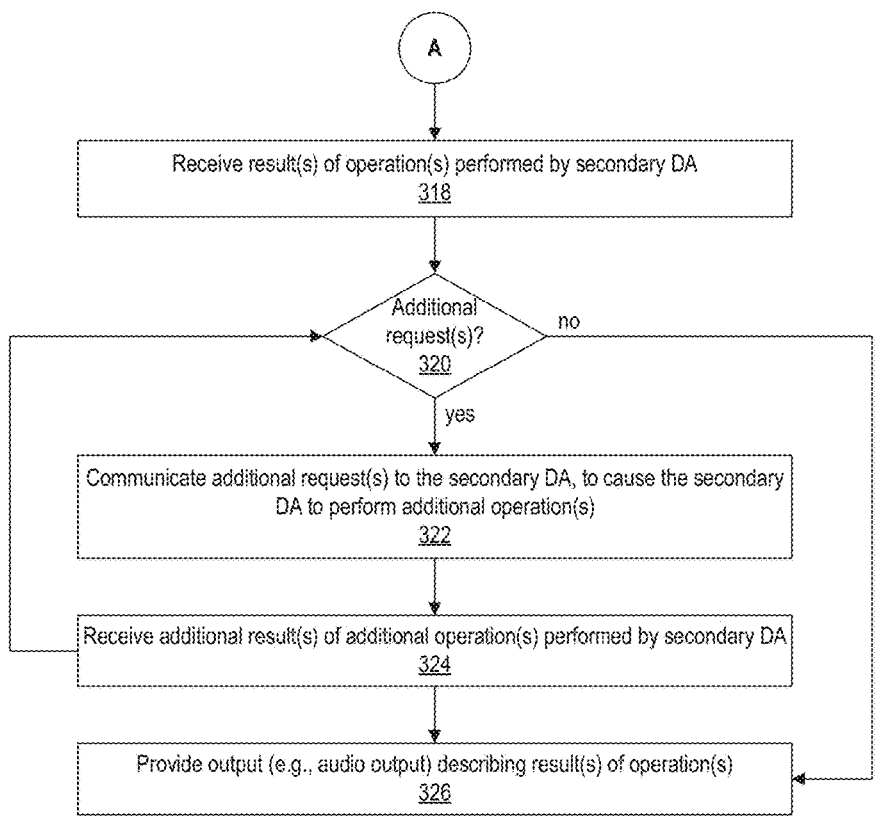

FIGS. 3A and 3B depict a flow diagram of an example process for managing interactions between digital assistants, according to implementations of the present disclosure. One or more operations of the process may be performed by one or more of the DA 106, the DA broker 110, the DA(s) 114, the microphone 202, the STT module(s) 208, the service(s) 212, or other software module(s) executing on the computing device(s) 102, the server device(s) 206, or elsewhere.

With reference to FIG. 3A, a request 108 may be received (302) at a first (e.g., primary) DA 106. The request 108 may include speech input 204 from a user 104. Text data may be determined (304) based on an analysis of the request 108. For example, the request 108 may be processed by STT module(s) to generate at least a partial textual transcript of the speech input 204. In some implementations, the request 108 may be received as text data from the user 104.

A DA directory 112 may be accessed (306). As described above, the DA directory 112 may include a list of keywords associated with each of a plurality of DAs 114 available in a computing environment 100. In some implementations, the DA directory 112 may be accessed responsive to a determination that the primary DA 106 is not capable of handling the request 108 alone without delegating to a secondary DA 114.

Based on the information in the DA directory 112, a determination may be made (308) of a number of DAs that are associated with keyword(s) that correspond to one or more terms 210 present in the request 108. If the number is zero, the DA 106 may request that the user 104 clarify their request 108 (310), and/or the DA 106 may indicate that the request 108 cannot be processed. If the number is greater than one, the DA 106 may request that the user 104 indicate which of the suitable DAs 114 is to be used, and the DA 106 may receive a voice command or other input from the user 104 indicating the user's selection (312). The process may then proceed to 316. If the number is one, the process may determine (314) the second DA 114 as the one that corresponds to the term(s) 210 in the request 108.

At least a portion of the request 108 may be communicated (316) to the determined secondary DA 114 to cause the secondary DA 114 to perform one or more operations to process (e.g., handle) the request 108. As described above, the request 108 may be communicated as text data and/or audio data. The process may continue as described with reference to FIG. 3B.

The primary DA 106 may receive (318) one or more results of the operation(s) performed by the secondary DA 114. A determination may be made (320), e.g., by the primary DA 106, whether one or more additional requests are needed to complete the processing of the request 108. If not, the process may provide output (326) to the user 104 describing the result(s) of the operation(s) to handle the request 108. Such output may be audio output, visual output through a graphical user interface, and/or other types of output.

If additional request(s) are needed, the additional request(s) may be communicated (322) to the secondary DA 114 to cause the secondary DA 114 to perform additional operation(s) for processing the request 108. Additional result(s) of the additional operation(s) may be received (324) at the primary DA 106, and a decision may be made whether for request(s) are needed (320). In this way, the primary DA 106 and the secondary DA 114 may engage in a conversation to cooperatively process the user's request 108, over as many iterations of requested operations and results as needed. Based on a determination (320) that no further additional requests are needed, the primary DA 106 may provide output (326) describing the various result(s) of the operation. In some examples, the output may simply be an acknowledgement the processing of the request 108 has completed (e.g., "funds transfer complete").

In some instances, a user may make an initial request (e.g., as speech input), and a first DA may begin the session to respond to the initial request. The session may progress with any number of follow-up queries submitted by the user, and any number of responses to such queries. In this way, a session may be described as a conversation between the user and any appropriate number of DA(s) handling the user's various requests for information and/or actions to be performed. In some implementations, during the session, a particular DA may be handling (e.g., may control) the interaction with the user at any given time. A DA may transfer control to another DA based on a particular query of the user. For example, if the user asks a question that is best answered by a different (e.g., more specialized or differently specialized) DA, the currently controlling DA may pass control to the other DA which may then act as the controlling DA. That DA may pass control back to the first DA after the specialized requests are satisfied, or may pass control on to another DA that is suitable for handling another set of queries.

In some implementations, the session between the user and the DA(s) may be a voice interaction session, which may also be described as a speech interaction session, in which the user speaks commands or requests and the DA(s) respond and provide information to the user through generated speech output. The session may also include other types of user input to various interface(s) of the DA(s), and the DA(s) providing other types of output such as displayed text or graphics, haptic output, and so forth. The passing of control between DAs may include a transfer of the voice interaction session from a first DA to a second DA, such that the session is handled by the second DA, until the session ends or until the second DA passes control to another DA. In this way, passing control may be described as another DA taking over the conversation and interacting with the user. When control is passed, the newly controlling DA may indicate to the user that it has begun handling the session. For example, the newly controlling DA may output, as speech or otherwise, "Hello—this is the XYZ assistant. I can help you with that." In some implementations, different DAs may use different voices for output so that the user may readily distinguish between the DAs and avoid confusion. For example, different DAs may use voices that differ in pitch, timbre, accent, volume, and/or other aspects.

In some implementations, state information may be transferred to the newly controlling DA from the previous DA, or the newly controlling DA may access the state information stored by the state machine as described above. The transfer of, or access to, state information may enable the newly controlling DA to pick up the conversation without asking the user to repeat information previously provided to other DA(s). This may provide a relatively seamless user experience for the user as the session is passed among DAs as appropriate to better service the user's requests. The state information passed to, or accessed by, the various DAs involved in the session may provide context for the session, such as the identity of the user, characteristics of the user, previous requests of the user during the current session or previous sessions, responses to the user to the current session or previous sessions, and so forth.

In some implementations, the state information passed between DAs may be tagged with metadata that indicates the origin or provenance of the information. For example, information that is generated by a first DA may be tagged with metadata that identifies the first DA as the source of the information, and the tagged information may be passed to a second DA during a session as control is transferred from the first DA to the second DA. The second DA may employ the metadata to determine the source of the transferred information.

Figure 4A:
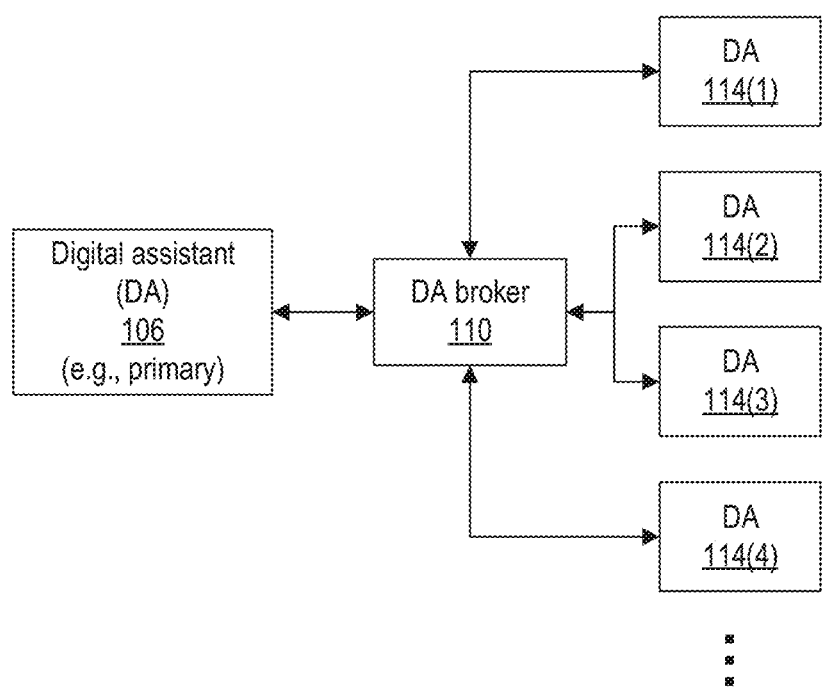
FIGS. 4A-4C depict example topologies for using multiple digital assistants during a session to process requests, according to implementations of the present disclosure.
Figure 4B:
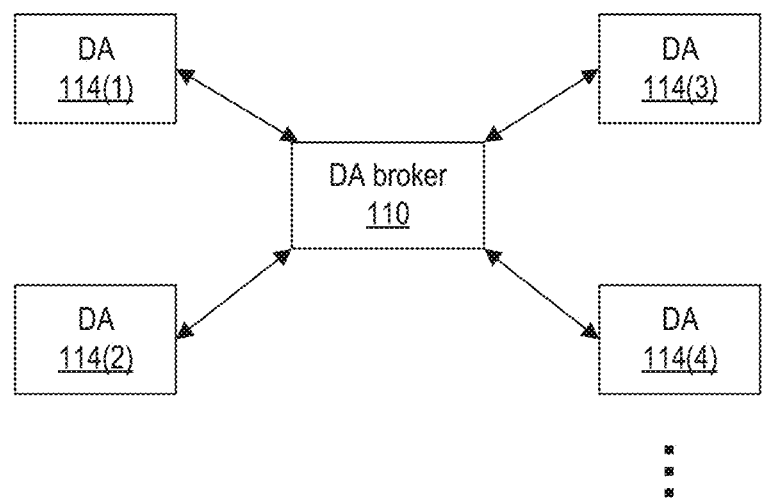
Figure 4C:
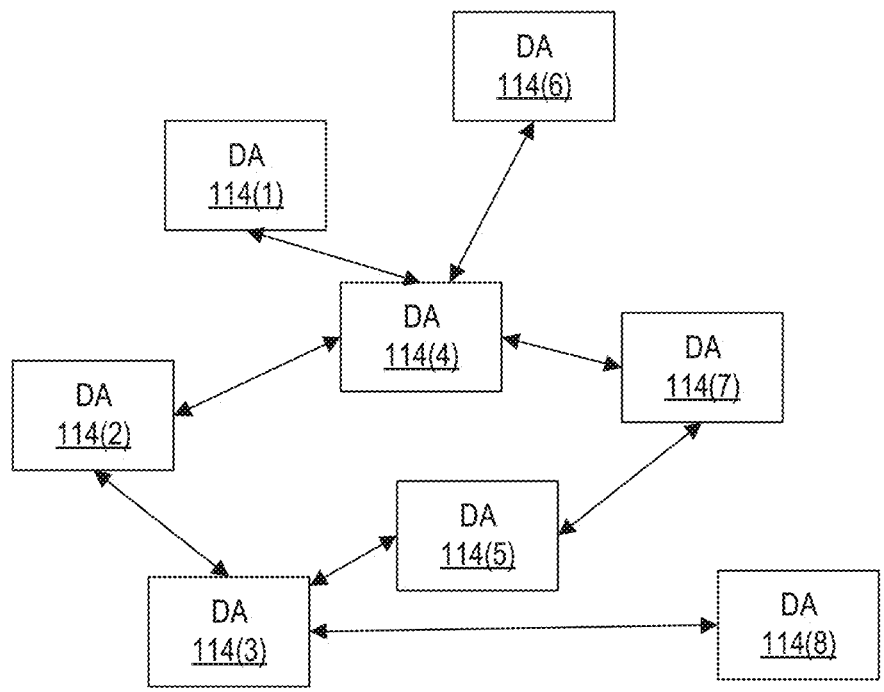

FIGS. 4A-4C depict example topologies for using multiple digital assistants during a session to process requests, according to implementations of the present disclosure. Implementations support the use of different such topologies to pass control among various available DAs.

FIG. 4A illustrates an example topology as shown in FIG. 1. In this example, a first DA 106 (e.g., a primary DA) receives the first voice (or other) input from the user, and begins the session with the user. At some point, if the user makes a request that the primary DA cannot satisfy, the DA may interact with the DA broker 110 to determine another DA that may be suitable for handling the request. The broker may identify the other DA to the primary DA, and the primary DA may transfer the session to the other DA. In some instances, the other DA may transfer control back to the primary DA after the particular request is satisfied, and the session may terminate or continue. In the topology, the primary DA acts as a mediator to determine when another DA may be needed, ask the broker to identify another suitable DA, pass control to the other DA for as long as needed to satisfy particular user request(s), and resume control once the particular request(s) are satisfied.

FIG. 4B illustrates an example topology in which there is no predetermined primary DA as in FIG. 4A. Instead, any suitable DA may initiate the session with the user and pass control of the session to other DA(s) as needed to satisfy particular requests. In this example, the DA broker 110 is accessible by each of the DAs, in a hub-and-spoke type of topology, and each of the DAs may interact with the broker to determine a next suitable DA to control the session, if the current DA receives a request that it is unable to handle.

FIG. 4C illustrates an example topology in which the DAs may interact directly with one another in a graph type of topology. In this example, each of the DAs may be a node that includes a data broker that is configured to determine the capabilities of other DA(s) in the system. Interactions between DAs may be one-to-one, with one DA passing control to a single other DA during a session. Interactions may also be one-to-many, with a particular DA passing control to multiple DAs during a session.

In some implementations, state information is passed between DAs during a session, either directly from DA to DA or with the DA(s) accessing the state information stored and maintained by the state machine as described above. Alternatively, multiple DAs may be listening in to a session at a time, even as a particular DA is controlling the interaction with the user. In this scenario, the multiple DAs may each collect their own version of the state information as the session progresses, and therefore may not need to receive the state information from other DA(s) or from the stored state information. In such instances, the DAs may be able to listen into and collect state information according to their various permissions. For example, one DA may be permitted to collect particular type(s) of information, but may be barred from collecting other types of data during a session.

In some implementations, the broker such as the DA broker 110 and/or the individual broker(s) operating on individual DA nodes may employ machine learning to determine how to route requests among DAs. Implementations support the use of any suitable machine learning techniques, such as supervised or unsupervised machine learning. Through machine learning, the broker may, over time, develop a model that enables it to predict user intentions based on information provided from the user and/or context of a session. The model may then be employed to determine which DA is suitable for handling particular user requests during a session.

Figure 5:
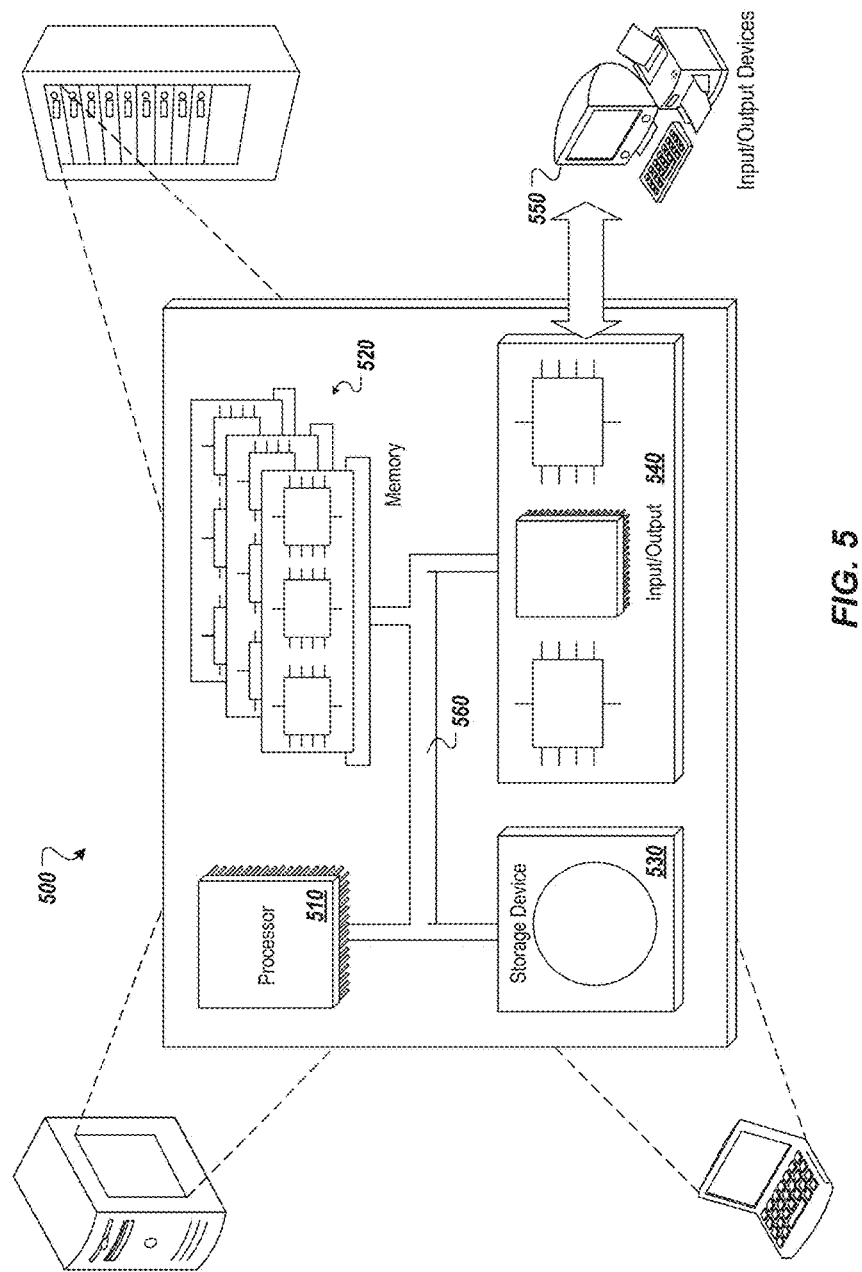
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the computing device(s) 102, the server device(s) 206(1), the server device(s) 206(2), or other device(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   receiving, by the at least one processor, a first request communicated to a first digital assistant (DA) executing on a computing device and, in response, initiating a communication session between a user and the first DA to handle the first request; and
   receiving, by the at least one processor, during the communication session, a second request and determining, during the communication session between the user and the first DA, that the second request is for communication of sensitive information to be inaccessible by the first DA;
   determining, by the at least one processor, a second DA that is configured to complete the second request by providing the sensitive information, wherein the second DA executes on the computing device that executes the first DA, and wherein determining the second DA includes:
      accessing a DA directory that includes, for each of a plurality of available DAs on the computing device, a respective list of associated keywords;
      determining that at least one term in the second request corresponds to at least one keyword that is associated, in the DA directory, with multiple candidate DAs, wherein the at least one keyword corresponds to the sensitive information; and
      receiving, by the first DA, a selection by the user of the second DA from the multiple candidate DAs;
   wherein the DA directory indicates that: i) the second DA is associated with the at least one keyword that corresponds to the sensitive information, and ii) that the first DA is not associated with the at least one keyword that corresponds to the sensitive information;
   responsive to the determining of the second DA, executing, by the at least one processor, the second DA on the computing device in a trusted execution container to isolate the execution of the second DA from the execution of the first DA; and
   transferring, by the at least one processor, the communication session from the first DA to the second DA executing in the trusted execution container to complete the second request during a time period in the communication session when the second DA is interacting with the user and the first DA is prevented from interacting with the user, wherein the second DA completes the second request by accessing the sensitive information that is inaccessible by the first DA.

2. The method of claim 1, wherein determining the second DA further comprises:
   accessing the DA directory that includes, for each of a plurality of DAs, a list of associated keywords; and
   determining that at least one term in the second request corresponds to at least one keyword that is associated, in the DA directory, with the second DA.

3. The method of claim 2, wherein determining that the at least one term in the second request corresponds to the at least one keyword includes one or more of:
   determining that the at least one term matches the at least one keyword; or
   determining that the at least one term is semantically similar to the at least one keyword.

4. The method of claim 1, wherein determining the second DA further comprises:
   requesting, by the first DA, that the user select the second DA from the plurality of candidate DAs.

5. The method of claim 1, wherein the determining of the second DA is based on a model that is developed through machine learning.

6. The method of claim 1, wherein the communication session is a voice communication session in which the first request and the second request are provided as voice input from the user.

7. The method of claim 6, wherein:
   the first DA provides first audio output associated with handling the first request during the voice communication session;
   the second DA provides second audio output associated with handling the second request during the voice communication session; and
   the first audio output is provided by the first DA in a different voice than that in which the second audio output is provided by the second DA.

8. The method of claim 1, further comprising:
   receiving, by the at least one processor, during the communication session, a third request and, based at least partly on at least one term in the third request, determining a third DA to at least partly process the third request, wherein the third DA is executable on the computing device; and
   transferring, by the at least one processor, the communication session from the second DA to the third DA to handle the third request.

9. The method of claim 1, wherein transferring the communication session from the first DA to the second DA causes the second DA to handle the second request and at least one subsequent request received during the communication session.

10. The method of claim 1, wherein transferring the communication session from the first DA to the second DA includes transferring state information for the communication session from the first DA to the second DA, the state information at least describing information previously communicated during the communication session.

11. The method of claim 1, further comprising:
storing, by the at least one processor, state information that at least describes information communicated during the communication session;
wherein transferring the communication session from the first DA to the second DA includes accessing, by the second DA, the stored state information.

12. A system, comprising:
at least one processor; and
a memory communicatively coupled to the at least one processor, the memory storing instructions which, when executed by the at least one processor, cause the at least one processor to perform operations comprising:
receiving a first request communicated to a first digital assistant (DA) executing on a computing device and, in response, initiating a communication session between a user and the first DA to handle the first request; and
receiving, during the communication session, a second request and, determining, during the communication session between the user and the first DA, that the second request is for communication of sensitive information to be inaccessible by the first DA;
determining a second DA that is configured to complete the second request by providing the sensitive information, wherein the second DA executes on the computing device that executes the first DA, and wherein determining the second DA includes:
accessing a DA directory that includes, for each of a plurality of available DAs on the computing device, a respective list of associated keywords;
determining that at least one term in the second request corresponds to at least one keyword that is associated, in the DA directory, with multiple candidate DAs, wherein the at least one keyword corresponds to the sensitive information; and
receiving, by the first DA, a selection by the user of the second DA from the multiple candidate DAs;
wherein the DA directory indicates that: i) the second DA is associated with the at least one keyword that corresponds to the sensitive information, and ii) that the first DA is not associated with the at least one keyword that corresponds to the sensitive information;
responsive to the determining of the second DA, executing the second DA on the computing device in a trusted execution container to isolate the execution of the second DA from the execution of the first DA; and
transferring the communication session from the first DA to the second DA executing in the trusted execution container to complete the second request during a time period in the communication session when the second DA is interacting with the user and the first DA is prevented from interacting with the user, wherein the second DA completes the second request by accessing the sensitive information that is inaccessible by the first DA.

13. The system of claim 12, wherein determining the second DA further comprises:
requesting, by the first DA, that the user select the second DA from the plurality of candidate DAs.

14. The system of claim 12, wherein the determining of the second DA is based on a model that is developed through machine learning.

15. The system of claim 12, wherein the communication session is a voice communication session in which the first request and the second request are provided as voice input from the user.

16. The system of claim 15, wherein:
the first DA provides first audio output associated with handling the first request during the voice communication session;
the second DA provides second audio output associated with handling the second request during the voice communication session; and
the first audio output is provided by the first DA in a different voice than that in which the second audio output is provided by the second DA.

17. The system of claim 12, the operations further comprising:
receiving, during the communication session, a third request and, based at least partly on at least one term in the third request, determining a third DA to at least partly process the third request, wherein the third DA is executable on the computing device; and
transferring the communication session from the second DA to the third DA to handle the third request.

18. The system of claim 12, wherein transferring the communication session from the first DA to the second DA causes the second DA to handle the second request and at least one subsequent request received during the communication session.

19. The system of claim 12, wherein transferring the communication session from the first DA to the second DA includes transferring state information for the communication session from the first DA to the second DA, the state information at least describing information previously communicated during the communication session.

20. One or more non-transitory computer-readable media storing instructions which, when executed by at least one processor, cause the at least one processor to perform operations comprising:
receiving a first request communicated to a first digital assistant (DA) executing on a computing device and, in response, initiating a communication session between a user and the first DA to handle the first request; and
receiving, during the communication session, a second request and determining, during the communication session between the user and the first DA, that the second request is for communication of sensitive information to be inaccessible by the first DA;
determining a second DA that is configured to complete the second request by providing the sensitive information, wherein the second DA executes on the computing device that executes the first DA, and wherein determining the second DA includes:
accessing a DA directory that includes, for each of a plurality of available DAs on the computing device, a respective list of associated keywords;
determining that at least one term in the second request corresponds to at least one keyword that is associated, in the DA directory, with multiple candidate DAs, wherein the at least one keyword corresponds to the sensitive information; and
receiving, by the first DA, a selection by the user of the second DA from the multiple candidate DAs;
wherein the DA directory indicates that: i) the second DA is associated with the at least one keyword that corresponds to the sensitive information, and ii) that the first DA is not associated with the at least one keyword that corresponds to the sensitive information;

responsive to the determining of the second DA, executing the second DA on the computing device in a trusted execution container to isolate the execution of the second DA from the execution of the first DA; and transferring the communication session from the first DA to the second DA executing in the trusted execution container to complete the second request during a time period in the communication session when the second DA is interacting with the user and the first DA is prevented from interacting with the user, wherein the second DA completes the second request by accessing the sensitive information that is inaccessible by the first DA.

* * * * *